(12) United States Patent
Subramanian et al.

(10) Patent No.: US 9,576,290 B2
(45) Date of Patent: Feb. 21, 2017

(54) CONTROLLING ECOMMERCE AUTHENTICATION BASED ON COMPARING CARDHOLDER INFORMATION AMONG ECOMMERCE AUTHENTICATION REQUESTS FROM MERCHANT NODES

(71) Applicant: CA, INC., Islandia, NY (US)

(72) Inventors: Revathi Subramanian, San Diego, CA (US); Paul C Dulany, San Diego, CA (US); Hongrui Gong, San Diego, CA (US); Kannan Shashank Shah, San Diego, CA (US)

(73) Assignee: CA, Inc., New York, NY (US)

( * ) Notice: Subject to any disclaimer, the term of this patent is extended or adjusted under 35 U.S.C. 154(b) by 333 days.

(21) Appl. No.: 14/221,652

(22) Filed: Mar. 21, 2014

(65) Prior Publication Data
US 2015/0269579 A1    Sep. 24, 2015

(51) Int. Cl.
*G06Q 40/00* (2012.01)
*G06Q 20/40* (2012.01)
*G06Q 20/34* (2012.01)
*G06Q 20/08* (2012.01)
*G06Q 20/12* (2012.01)

(52) U.S. Cl.
CPC ...... *G06Q 20/4016* (2013.01); *G06Q 20/0855* (2013.01); *G06Q 20/12* (2013.01); *G06Q 20/34* (2013.01); *G06Q 20/4012* (2013.01)

(58) Field of Classification Search
CPC ........ G06F 21/55; G06F 21/566; G06Q 20/10; G06Q 20/3674; G06Q 20/401; G06Q 30/0609; G07F 7/1008
See application file for complete search history.

(56) References Cited

U.S. PATENT DOCUMENTS

| 8,832,790 B1* | 9/2014 | Villa ................... H04L 63/123 726/2 |
| 2011/0196791 A1* | 8/2011 | Dominguez ........... G06Q 40/00 705/44 |

OTHER PUBLICATIONS

Unknown, Artificial neural network, Feb. 28, 2013, www.wikipedia.org.*

* cited by examiner

*Primary Examiner* — Scott S Trotter
(74) *Attorney, Agent, or Firm* — Myers Bigel, P.A.

(57) ABSTRACT

A method of operating a computer system is disclosed. An eCommerce authentication request is received from a merchant node. The eCommerce authentication request has content including cardholder information. A risk score for the eCommerce authentication request is generated based on comparison of the cardholder information of the eCommerce authentication request to cardholder information of eCommerce authentication requests of a plurality of merchant nodes. The eCommerce authentication request is selectively provided to an authentication node based on the risk score.

22 Claims, 7 Drawing Sheets

CONTROLLING ECOMMERCE AUTHENTICATION BASED ON COMPARING CARDHOLDER INFORMATION AMONG ECOMMERCE AUTHENTICATION REQUESTS FROM MERCHANT NODES

BACKGROUND

The present disclosure relates to financial transaction processing systems.

Financial transactions relating to purchasing goods and services are predominately paid for using credit accounts and debit accounts that an account owner accesses through associated credit cards and debit cards. Financial transaction processing systems provide verification processes that allow merchants to verify that account information is valid and the account owner has sufficient credit or debit funds to cover the purchase.

When a purchaser is located at the merchant's facility, the merchant is responsible for authenticating that the purchaser is the account owner by, for example, comparing the purchaser's signature to a existing signature on the card, examining a picture ID of the purchaser, or providing a password.

For purchases made through a merchant's website and other electronic commerce ("eCommerce") transactions (known as a card-not-present transactions (CNP)), financial transaction processing systems can use eCommerce authentication processes that challenge the purchaser to provide a security code that is used to authenticate that the purchaser is the account owner or is otherwise authorized by the account owner. The security code may be a password, personal identification number (PIN), or other information known to the account owner such as a one time password received through e-mail, etc. Purchasers can find eCommerce authentication processes undesirable due to the need to remember security codes and the requirement to successfully complete additional process steps for purchases. Merchants can find eCommerce authentication processes undesirable because of the fees charged for use of such processes and lost sales due to purchasers abandoning transactions during the eCommerce authentication processes.

SUMMARY

Some embodiments disclosed herein are directed to a method of operating a computer system. An eCommerce authentication request is received from a merchant node. The eCommerce authentication request has content including cardholder information. A risk score for the eCommerce authentication request is generated based on comparison of the cardholder information of the eCommerce authentication request to cardholder information of eCommerce authentication requests of a plurality of merchant nodes. The eCommerce authentication request is selectively provided to an authentication node based on the risk score.

Some other embodiments disclosed herein are directed to an authentication gateway node that includes a processor and a memory. The memory is coupled to the processor and includes computer readable program code that when executed by the processor causes the processor to perform operations. The operations include receiving an eCommerce authentication request from a merchant node. The eCommerce authentication request has content including cardholder information. The operations further include generating a risk score for the eCommerce authentication request based on comparison of the cardholder information of the eCommerce authentication request to cardholder information of eCommerce authentication requests of a plurality of merchant nodes, and selectively providing the eCommerce authentication request to an authentication node based on the risk score.

Some other embodiments disclosed herein are directed to a computer program product that includes a computer readable storage medium having computer readable program code embodied in the medium that when executed by a processor of a computer system causes the computer system to perform operations. The operations include receiving an eCommerce authentication request from a merchant node. The eCommerce authentication request has content including cardholder information. The operations further include generating a risk score for the eCommerce authentication request based on comparison of the cardholder information of the eCommerce authentication request to cardholder information of eCommerce authentication requests of a plurality of merchant nodes, and selectively providing the eCommerce authentication request to an authentication node based on the risk score.

Other methods, authentication gateway nodes, and computer program products according to embodiments will be or become apparent to one with skill in the art upon review of the following drawings and detailed description. It is intended that all such additional methods, authentication gateway nodes, and computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Figure 1:
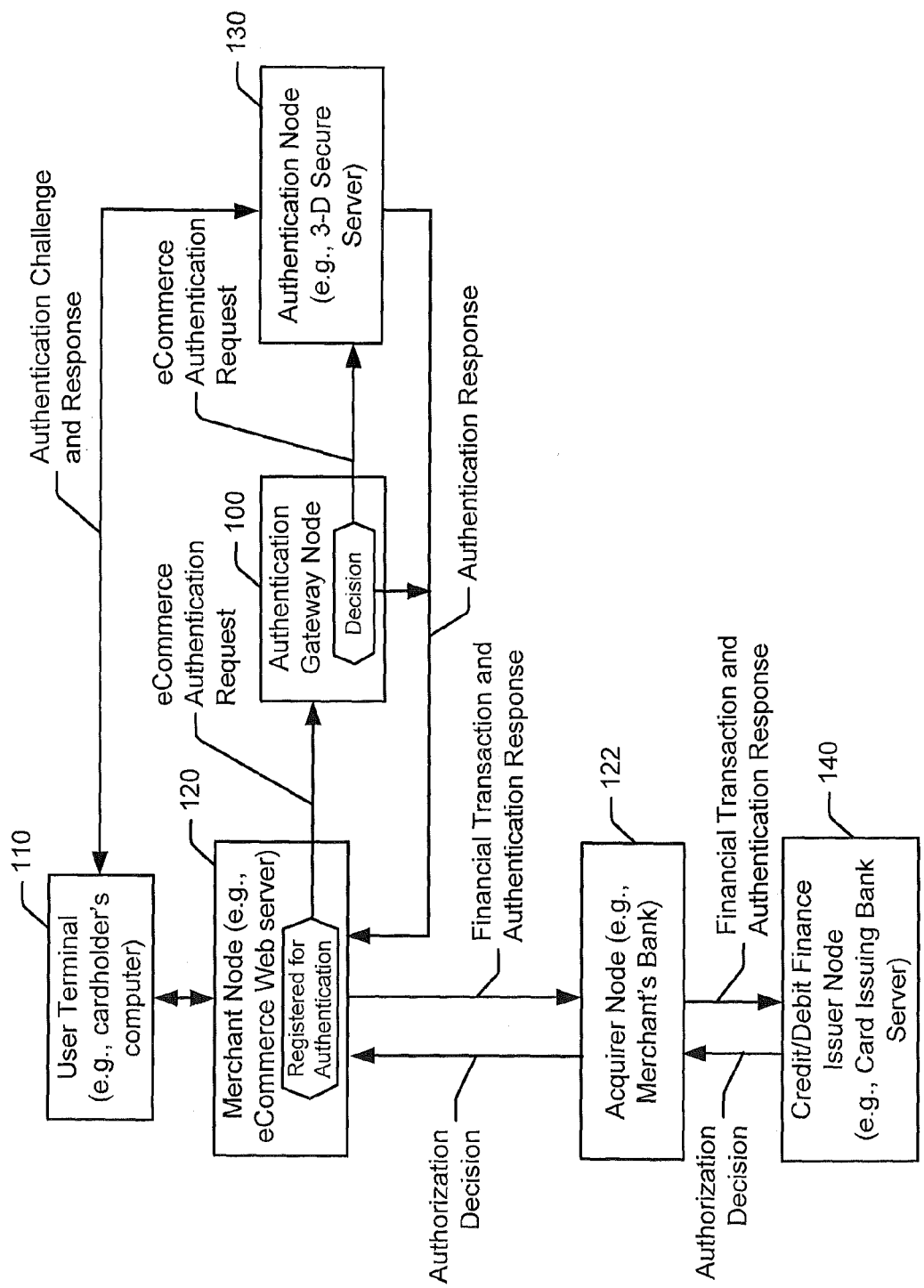
FIG. 1 is a block diagram of a financial transaction processing system that includes an authentication gateway node that controls which eCommerce authentication requests are authenticated by an authentication node, in accordance with some embodiments.

FIG. 1 is a block diagram of a financial transaction processing system that includes an authentication gateway node 100 (e.g., a computer system, computer server or program code executed by another node disclosed herein) that controls which eCommerce authentication requests are authenticated by an authentication node 130 in accordance with some embodiments. Although some embodiments are described in the context of authenticating credit card and/or debit card transactions for purchases made through a merchant's node 120 (e.g., merchant's eCommerce Web server), the embodiments disclosed herein are not limited thereto and can be used with other types of authentication processes.

Referring to FIG. 1, a person who is purchasing an item (purchaser) operates a user terminal 110 to select items to be purchased, and provides (e.g., types, electronically scans, executes an application on the user terminal 100 that outputs, etc.) cardholder information that can include any one or more of: an account number (e.g., credit card number and/or debit card number); customer name; account verification information; cardholder's name; an expiration date for the card; a card verification value (CVV); the cardholder's home address; and the purchaser's shipping address. The cardholder information is communicated by the user terminal 110 to the merchant node 120. The user terminal 110 may be any electronic device that can communicate with a merchant node 120 including, but not limited to, a tablet computer, desktop computer, laptop computer, smart phone, a point-of-sale merchant terminal, etc.

Because of the prevalence of fraud occurring in eCommerce and other card-not-present financial transactions, where merchants cannot directly authenticate purchasers using picture IDs, electronic authentication processes have been introduced to authenticate purchasers. Electronic authentication processes can be performed by an authentication node 130 to attempt to confirm that the purchaser is an account owner or is otherwise authorized by the account owner.

If the merchant node 120 is registered for use of electronic authentication processes, the merchant node 120 generates an eCommerce authentication request containing content items (also referred to as "items of content") that includes cardholder information, which can include or more items of the cardholder information received from the user terminal 100, and may include further information relating to the user terminal 100. The cardholder information contained as items of content of the eCommerce authentication request can include any one or more of:
 1) account number (e.g., credit/debit card number);
 2) expiration date for the card;
 3) verification value (e.g., CVV);
 4) cardholder's name;
 5) the cardholder's home address;
 6) the purchaser's shipping address;
 7) identifier for the purchaser's user terminal (e.g., network address of the user terminal, computer name, computer hardware identifier, and/or mobile identification number for mobile phone);
 8) characteristics of the purchaser's user terminal (e.g., manufacturer, web browser characteristics, and/or operational characteristics); and
 9) geographic region of the purchaser's user terminal.

The merchant node 120 may include additional items of content in the eCommerce authentication request that can include any one or more of:
 1) amount of the financial transaction;
 2) identifier for the merchant node 120;
 3) a geographic region of the merchant node 120;
 4) identifier for the acquirer node 122;
 5) time of transaction; and
 6) date of transaction.

Because the identifier for the user terminal can be defined by a network address associated with the user terminal (e.g., IP address), the identifier for the user terminal may be tied to the network address of a network access node (e.g., cable modem, DSL modem, wireless access point, etc). The network address may thereby identify a plurality of different user terminals that communicate via the same network access node through the Internet or other data network (e.g., public/private network) with the merchant node 120.

The merchant node 120 communicates the eCommerce authentication request toward the authentication node 130 for authentication processing to authenticate the purchaser. The merchant node 120 may communicate the eCommerce authentication request using a software plug-in provided by a provider of the authentication node 130. Authentication of the purchaser can include determining whether the purchaser possesses secret information that should only be known to the account owner or another person who has been authorized by the account owner to make purchases using the account.

As will be explained in further detail below, an authentication gateway node 100 is disclosed herein that controls which eCommerce authentication requests from the merchant node 120 and other merchant nodes 120 cause authentication of purchasers. The authentication gateway node 100 may intercept the eCommerce authentication request from the merchant node 120 and determine whether authentication will be performed by the authentication node 130. The authentication gateway node 100 may, for example, selectively either route the eCommerce authentication request to the authentication node 130 for authentication or respond to the merchant node 120 without authentication by the authentication node 130 (e.g., some eCommerce authentication requests bypass the authentication node 130). Alternatively, the authentication gateway node 100 may mark the eCommerce authentication requests to indicate whether they are to be authenticated by the authentication node 130 (e.g., all eCommerce authentication requests flow through the authentication node 130 but only some cause authentication). These and other operations by the authentication gateway node 100 are described in further detail below.

Pursuant to one type of authentication process, the authentication node 130 communicates an authentication challenge message to the user terminal 110 which requires the purchaser to enter a security code to complete the purchase. The entered security code is returned to the authentication node 130 in a response message. The security code may be a password, personal identification number (PIN), electronic security token, or other secret information known to the account owner.

The authentication node 130 can compare the security code to an expected code, and apply one or more rules which may be defined by the card issuing bank (referred to more generally as the credit/debit finance issuer node below) to generate an authentication response (e.g., authentication response code) that indicates an outcome of the authentication process.

One type of authentication process is known as a 3-D Secure protocol that can be performed by the authentication node 130 operating as a 3-D Secure authentication server. The 3-D Secure protocol was developed by financial card associations, including Visa and MasterCard, and has become an industry standard. The protocol uses XML messages sent over secure socket layer (SSL) connections between user terminal 110 or other client authentication terminals and the authentication node 130, which can also be referred to as an access control server (ACS). The authentication challenge can be presented through the user terminal 110 to the purchaser within the same web browser window as an in-line session (referred to as an inframe authentication session) or can be presented in a separate window (e.g., pop-up window).

An advantage to merchants of using purchaser authentication is a reduction in "unauthorized transaction" chargebacks. A disadvantage to merchants is that they pay a software setup fee, monthly fee, and per-authentication fee for use of the 3-D Secure access control server provided by the authentication node 130. Moreover, 3-D Secure operation can be complicated and create transaction failures.

Some purchasers view the additional authentication steps as a nuisance or obstacle to completing transactions and/or they erroneously interpret the authentication challenge (e.g., pop-up window) as originating from a fraudulent phishing site/process, which can result in a substantial increase in transaction abandonment by the purchaser and lost revenue to merchants. Some 3-D Secure authentication processes require the purchaser to complete an authentication registration process for the cardholder's financial account, including agreeing to all terms and conditions presented by 3-D Secure, before the purchaser can proceed with a purchase. Purchasers who are unwilling to undertake the risk or inconvenience of registering their card during a purchase, are forced to abandon the transaction. Moreover, some user terminals, such as those having mobile web browsers, can lack features (e.g, support for window frames and/or pop-ups) necessary for proper operation of a 3-D Secure authentication process.

For these and other reasons, some embodiments disclosed herein are directed to the authentication gateway node 100 that generates risk scores for eCommerce authentication requests and selectively provides the eCommerce authentication requests to the authentication node 130 based on the risk scores. The authentication gateway node 100 can be configured to operate on eCommerce authentication requests in-flight before being delivered to the authentication node 130, and control, based on the risk scores, which of the eCommerce authentication requests are processed by the authentication node 130 for authentication of purchasers and generation of authentication responses based on the outcomes of the authentication.

In one embodiment, only eCommerce authentication requests having risk scores that satisfy a defined rule are provided to the authentication node 130 for authentication processing and generation of the authentication responses based on the authentication processing, and the other eCommerce authentication requests (having risk scores that do not satisfy the defined rule) bypass authentication processing by the authentication node 130. When bypassing authentication processing by the authentication node 130, the authentication gateway node 100 may generate an authentication response based on the risk score for the eCommerce authentication request (e.g., generate an authentication response indicating that the purchaser was properly authenticated) and communicate the authentication response to the merchant node 120 as if it had originated from the authentication node 130. When the authentication response is generated by the authentication gateway node 100, it may contain the same or similar content to an authentication response generated by the authentication node 130 so that the merchant node 120 is not aware that the authentication response was generated without authentication of the purchaser being performed by the authentication node 130.

Although the authentication gateway node 100 is shown as being separate from the merchant node 120, in some embodiments the authentication gateway node 100 is incorporated into the merchant node 120 so that at least some of the operations disclosed herein as being performed by the authentication gateway node 100 are performed within the merchant node 120. Thus for example, the risk scores can be generated internal to the merchant node 120 and used to control when eCommerce authentication requests are communicated to the authentication node 130. The merchant node 120 can use the risk score to selectively send an eCommerce authentication request to the authentication node 130 for authentication of the purchaser when the risk score satisfies a defined rule or send the financial transaction to the acquirer node 122 and credit/debit finance issuer node 140 for verification against the cardholder's account without authentication of the purchaser by the authentication node 130 when the risk score does not satisfy a defined rule.

Similarly, although the authentication gateway node 100 is shown as being separate from the authentication node 130, in some embodiments the authentication gateway node 100 is incorporated into the authentication node 130 so that at least some of the operations disclosed herein as being performed by the authentication gateway node 100 are performed within the authentication node 130. Thus for example, the risk scores can be generated internal to the authentication node 130 and used to control which of the eCommerce authentication requests cause authentication challenges to be generated to purchasers.

The authentication response (e.g., 3-D Secure authentication response code) can be generated by the authentication node 130, based on authentication processes performed with the purchaser and/or may be generated by the authentication gateway node 100 based on the risk score (e.g., without authentication processing by the authentication node 130) and provided to the merchant node 120. The merchant node 120 receives the authentication response and may deny the transaction based on content of the authentication response (e.g., based on the risk score generated by the authentication gateway node 100 and/or based on the result of authentication processes by the authentication node). The merchant node 120 can initiate verification of the transaction by communicating to a credit/debit finance issuer node 140, via an acquirer node 122 (e.g., merchant's bank), the authentication response and content of the eCommerce authentication request (e.g., cardholder information, other content of an eCommerce authentication request disclosed herein, etc).

The acquirer node 122 routes the authentication response and the content of the eCommerce authentication request to a credit/debit finance issuer node 140 (e.g., card issuing bank server such as a Visa or other card server via VisaNet, BankNet, etc.). The credit/debit finance issuer node 140 generates an authorization decision based on whether the account number has a sufficient credit limit and/or existing funds to cover the amount of the financial transaction, and can further generate the authorization decision based on the authentication response from the authentication node 130 and/or the authentication gateway node 100.

The credit/debit finance issuer node 140 communicates its authorization decision to the acquirer node 122, which communicates an authorization decision to the merchant node 120. The merchant node 120 decides whether to complete the transaction with the purchaser or to deny the transaction based on the authorization decision from the acquirer node 122.

Further example operations by the authentication gateway node 100 are explained below with regard to FIGS. 2-9.

Figure 4:
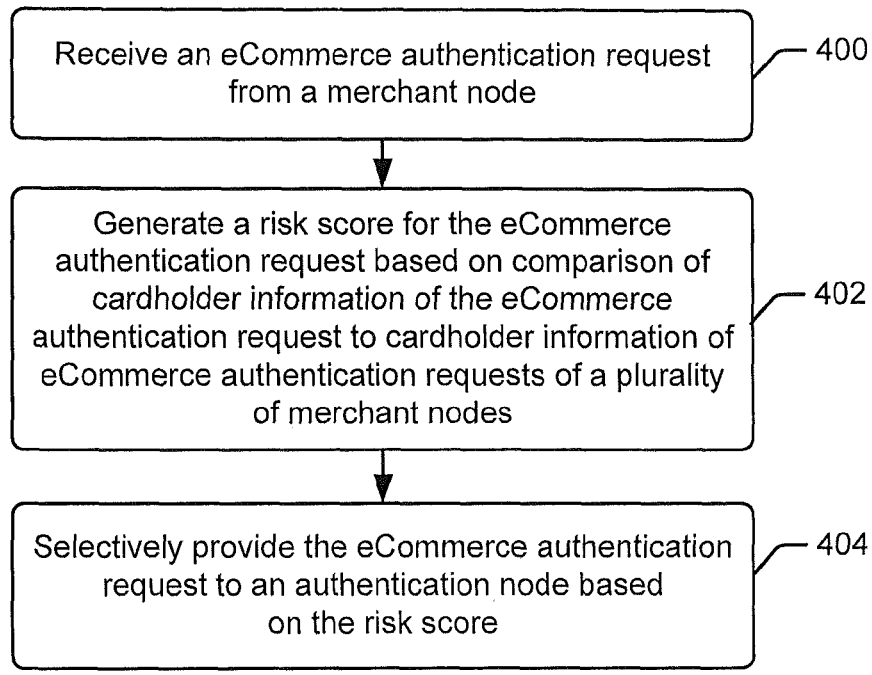
FIGS. 4-9 are flowcharts that illustrate operations that may be performed by an authentication gateway node to control which eCommerce authentication requests are authenticated by an authentication node, in accordance with some embodiments.
Figure 5:
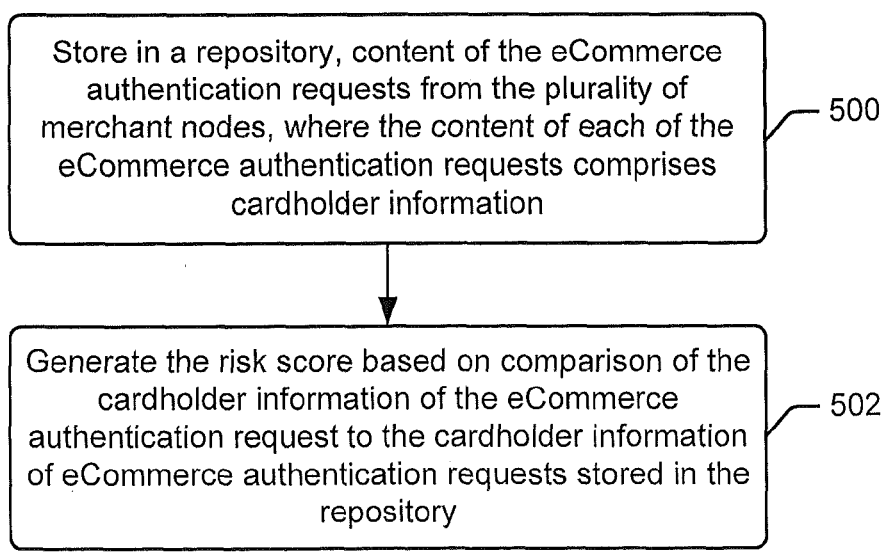

Referring to FIG. 1 and the related flowchart of FIG. 4, the authentication gateway node 100 receives (block 400) an eCommerce authentication request from the merchant node 120. The authentication gateway node 100 generates (block 402) a risk score for the eCommerce authentication request based on comparison of the cardholder information of the eCommerce authentication request to cardholder information of eCommerce authentication requests of a plurality of merchant nodes. The authentication gateway node 100 selectively provides (block 404) the eCommerce authentication request to the authentication node 130 based on the risk score.

The authentication gateway node 100 may maintain a repository of content for eCommerce authentication requests that it has processed, and can generate the risk score for a presently received eCommerce authentication request based on similarities of content of the received eCommerce authentication requests to other content having the same financial account information. Referring to FIG. 1 and the related flowchart of FIG. 5, the authentication gateway node 100 stores (block 500) in a repository, content of the eCommerce authentication requests from the plurality of merchant nodes 120. The content of each of the eCommerce authentication requests includes cardholder information. The authentication gateway node 100 generates (block 502) the risk score for the eCommerce authentication request based on comparing the cardholder information of the eCommerce authentication request to the cardholder information of eCommerce authentication requests stored in the repository.

As explained above, the cardholder information contained as items of content of the eCommerce authentication request can include any one or more of: the account number (e.g., credit/debit card number); expiration date for the card; verification value (e.g., CVV); cardholder's name; the cardholder's home address; the purchaser's shipping address; identifier for the purchaser's user terminal (e.g., network address of the user terminal, computer name, computer hardware identifier, and/or mobile identification number for mobile phone); characteristics of the purchaser's user terminal (e.g., manufacturer, web browser characteristics, and/or operational characteristics); and geographic region of the purchaser's user terminal.

Controlling which eCommerce authentication requests are provided to the authentication node 130 based on the risk scores can effectively prioritize authenticating only the eCommerce authentication requests that appear to have a greater risk of originating from purchasers who are not the account owner or otherwise authorized by the account owner for the purchase. The other eCommerce authentication requests can bypass authentication by the authentication node 130, allowing verification by a credit/debit finance issuer node 140 (e.g., card issuing bank server such as a Visa or MasterCard member bank server) to proceed. Because some, and perhaps most, eCommerce authentication requests are not authenticated by the authentication node 130, merchants can have substantially lower transaction costs (e.g., reduced per-transaction purchaser authentication fees by a reduced number of authenticated transactions) and fewer transaction abandonments due to fewer purchasers being challenged to complete authentication processes.

In further embodiments, the authentication gateway node 100 can generate a risk score indicating the need for authenticating an eCommerce authentication request based on similarity between a plurality of items of the content of the eCommerce authentication request to a plurality of items of the content of the eCommerce authentication requests in the repository having the same financial account information.

Thus, the authentication gateway node 100 can use one or more items of the cardholder information from a received eCommerce authentication request to search or otherwise determine among content in a repository maintained by the authentication gateway node 100 and/or to search among content in repositories located at the merchant nodes 120 to identify patterns of prior occurrence of the one or more items of the cardholder information across any of the merchant nodes 120 that use the authentication node 130 to authenticate eCommerce authentication requests. The patterns of use can be observable patterns of use of the same one or more items of the cardholder information in financial transactions that were earlier completed and/or in financial transactions that are presently pending awaiting authorization. The authentication gateway node 100 can generate the risk score based on the identified patterns of use.

By way of example, the authentication gateway node 100 may search or otherwise determine among the repository maintained by the authentication gateway node 100 and/or to search among content in repositories located at the merchant nodes 120 whether selected one or more of the following information has been used before in eCommerce authentication request from a plurality of merchant nodes 120: account number (e.g., credit/debit card number); expiration date for a card; verification value (e.g., CVV); cardholder's name; cardholder's home address; purchaser's shipping address; identifier for the purchaser's user terminal (e.g., network address of the user terminal, computer name, computer hardware identifier, and/or mobile identification number for mobile phone); characteristics of the purchaser's user terminal (e.g., manufacturer, web browser characteristics, and/or operational characteristics); and geographic region of the purchaser's user terminal.

Identifying such patterns of use of the same cardholder information across all merchant nodes 120 that use the authentication services of the authentication node 130 allows the authentication gateway node 100 to identify among the eCommerce authentication requests, received from the merchant nodes 120, which ones appear to have a higher likelihood of failing authentication if provided to the authentication node 130 or which otherwise are determined to have a level of trustworthiness that they originated from the account owner or another person authorized by the account owner.

The authentication gateway node 100 can use content of a received eCommerce authentication request to identify a cluster of eCommerce authentication requests, which are stored in a repository residing within the authentication gateway node 100, the merchant nodes 120, and/or elsewhere, that have content that satisfies a defined rule for similarity to content of the received eCommerce authentication request. Similarities or other patterns between items of content of the received eCommerce authentication request to items of content of the cluster of eCommerce authentication requests can be identified by the authentication gateway node 100 and used to generate the risk score for the received eCommerce authentication request.

Figure 7:
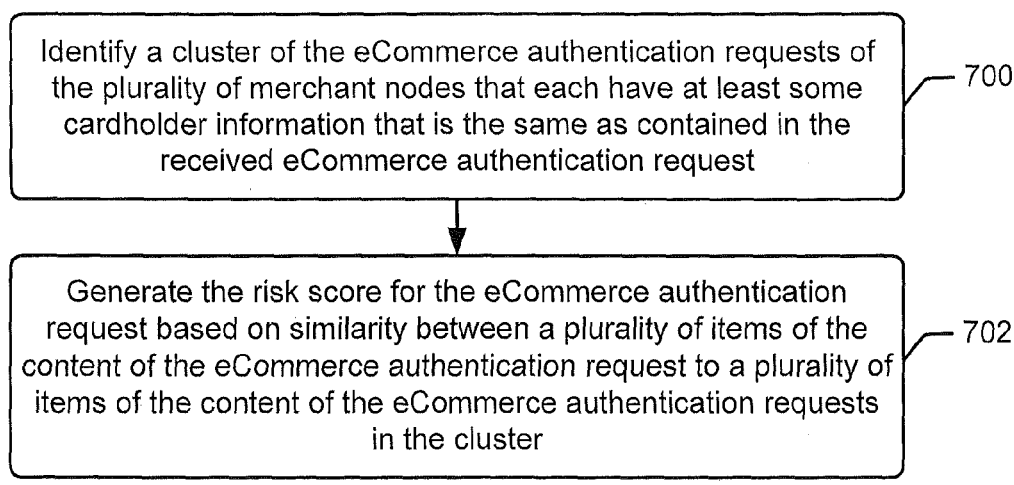

Referring to FIG. 1 and the example flowchart of FIG. 7, the authentication gateway node 100 identifies (block 700) (e.g., based on content stored in a repository residing within the authentication gateway node 100, the merchant nodes 120, and/or elsewhere) a cluster of the eCommerce authentication requests from a plurality of merchant nodes 120 that each have at least some cardholder information that is the same as content of the received eCommerce authentication request. The authentication gateway node 100 generates (block 702) the risk score for the received eCommerce authentication request based on similarity (defined by one or more rules) between a plurality of items of the content of the received eCommerce authentication request to a plurality of items of the content of the eCommerce authentication requests in the cluster.

In one embodiment, the authentication gateway node 100 generates the risk score for the received Commerce authentication request based on a number of the eCommerce authentication requests in the cluster (e.g., how many times the account number of the received eCommerce authentication request has been used before with any of the merchant nodes 120), and may further determine the risk score based on similarity of a plurality of items of the cardholder information of the Commerce authentication request to items of the cardholder information of the eCommerce authentication requests in the cluster (e.g., do the cardholder's names match, cardholder's home addresses match, etc.).

Thus, for example, a credit card that has been used to make similar purchase amounts at a high rate of occurrence with a plurality of merchant nodes 120 may be deemed a high risk for fraudulent activity based on a defined rule. The authentication gateway node 100 can therefore decide to provide the presently received eCommerce authentication request to the authentication node 130 for authentication of the purchaser.

In another embodiment, the authentication gateway node 100 generates the risk score for the received eCommerce authentication request based on a rate of occurrence of the cardholder information in the eCommerce authentication requests in the repository (e.g., how frequently requests having the cardholder information have occurred). The authentication gateway node 100 may generate the risk score to cause authentication of the purchaser to be performed when the rate is outside an expected range, such as being greater than a historical observed upper rate for a particular time of day and/or day or week/year, and/or when the rate is indicative of transactions against the cardholder information being electronically generated by a possibly malicious program instead of a human purchaser.

In another embodiment, the authentication gateway node 100 generates the risk score for the received eCommerce authentication request based on a number of different user terminals identified by cardholder information content of the eCommerce authentication requests in the cluster. The authentication gateway node 100 may generate the risk score to cause authentication of the purchaser to be performed when the number of different user terminals exceeds a defined threshold value (e.g., indication that the transactions are being generated by different people), which may be defined based on a historical observed number for the cardholder information.

In another embodiment, the authentication gateway node 100 generates the risk score for the received eCommerce authentication request based on whether the user terminal identified by cardholder information content of the received Commerce authentication request appears before in content of the eCommerce authentication requests in the cluster. The authentication gateway node 100 may generate the risk score to cause authentication of the purchaser to be performed when the user terminal identifier contained in the received eCommerce authentication request does not match any user terminal identifier contained in the eCommerce authentication requests in the cluster. Similarly, the authentication gateway node 100 may generate the risk score to cause authentication of the purchaser to be performed when the number of different user terminals contained in the eCommerce authentication requests in the cluster exceeds a defined threshold value, which may be defined based on a historical observed number of user terminals used with eCommerce authentication requests having the financial account information.

In another embodiment, the authentication gateway node 100 generates the risk score for the received Commerce authentication request based on whether the user terminal identified by cardholder information content of the received eCommerce authentication request appears in content of any of the eCommerce authentication requests in the cluster within at least at least a threshold time before receipt of the eCommerce authentication request. The authentication gateway node 100 may generate the risk score to cause authentication of the purchaser to be performed when the user terminal identified by content of the received eCommerce authentication request has not been used at once before in the least threshold time. The threshold time may be defined based on how long it is expected to take for an account owner to identify and report an authorized purchase. The threshold time may therefore be defined based on a reporting frequency of financial statements to the account owner.

In another embodiment, the authentication gateway node 100 generates the risk score for the received Commerce authentication request based on similarities between a user name identified by cardholder information content of the received eCommerce authentication request and user names identified by content of the eCommerce authentication requests in the cluster. The authentication gateway node 100 may generate the risk score to cause authentication of the purchaser to be performed when the user name of the received eCommerce authentication request does not match or sufficiently match (as defined by a rule) the user name(s) identified by content of the eCommerce authentication requests in the cluster.

In another embodiment, the authentication gateway node 100 generates the risk score for the received Commerce authentication request based on a pattern of the user name identified by content of the received eCommerce authentication request occurring in content of other eCommerce authentication requests in the cluster. The risk score may be generated based on how many other cardholder information items have been identified in other eCommerce authentication requests as being associated with the same or similar name (e.g., someone is making purchases using different cards of the same person). The risk score may additionally or alternatively be generated based on how much time elapsed between financial transactions that have occurred with the same user name as the received eCommerce authentication request but having different other financial account information items in their content.

In another embodiment, the authentication gateway node 100 generates the risk score for the received Commerce authentication request based on a pattern of the cardholder information, identified by content of the received eCommerce authentication request, occurring in other eCommerce authentication requests that are recorded in the repository (e.g., within the identified cluster of eCommerce authentication requests in the repository) with content identifying that the other eCommerce authentication requests originated from a same merchant node 120 as the received eCommerce authentication request.

In another embodiment, the authentication gateway node 100 generates the risk score for the received Commerce authentication request based on comparison of a geographic region identified by content of the received eCommerce authentication request to geographic region(s) identified by content of the eCommerce authentication requests in the cluster. The authentication gateway node 100 may generate the risk score to cause authentication of the purchaser to be performed when the geographic region identified by content of the received eCommerce authentication request is different than a geographic region(s) identified by content of other eCommerce authentication requests in the cluster. The geographic region may be identified based on, for example, a network address of the user terminal 110 identified by content of the eCommerce authentication requests.

In another embodiment, the authentication gateway node 100 generates the risk score for the received Commerce authentication request based on comparison of the expiration date identified by content of the received eCommerce authentication request to expiration date(s) identified by content of the eCommerce authentication requests in the cluster. The authentication gateway node 100 may generate the risk score to cause authentication of the purchaser to be performed when the compared expiration dates differ.

In another embodiment, the authentication gateway node 100 generates the risk score for the received Commerce authentication request based on comparison of the verification value (e.g., card verification value (CVV)) identified by content of the received eCommerce authentication request to verification value(s) identified by content of the eCommerce authentication requests in the cluster. The authentication gateway node 100 may generate the risk score to cause authentication of the purchaser to be performed when the compared verification values differ.

In another embodiment, the authentication gateway node 100 generates the risk score for the received Commerce authentication request based on comparison of a time of day of the received eCommerce authentication request to times of day identified by content of the eCommerce authentication requests in the cluster. The authentication gateway node 100 may generate the risk score to cause authentication of the purchaser to be performed when the time of day of the received eCommerce authentication request is outside a range of typical times of day identified by the eCommerce authentication requests in the cluster. Thus, when the account owner is located in the U.S. Pacific time zone and typically makes purchases during the evening hours, an eCommerce authentication request received in the early morning Pacific time may trigger the authentication gateway node 100 to generate the risk score to cause authentication of the purchaser to be performed.

In another embodiment, the authentication gateway node 100 generates the risk score for the received Commerce authentication request based on comparison of a day of the week of the received eCommerce authentication request to days of the week identified by content of the eCommerce authentication requests in the cluster. The authentication gateway node 100 may generate the risk score to cause authentication of the purchaser to be performed when the day of the week of the received eCommerce authentication request is not a typical day of the week identified by the eCommerce authentication requests in the cluster. Thus, when the account owner typically makes purchases on Saturday or Sunday, an eCommerce authentication request received on Wednesday may trigger the authentication gateway node 100 to generate the risk score to cause authentication of the purchaser to be performed.

Figure 2:
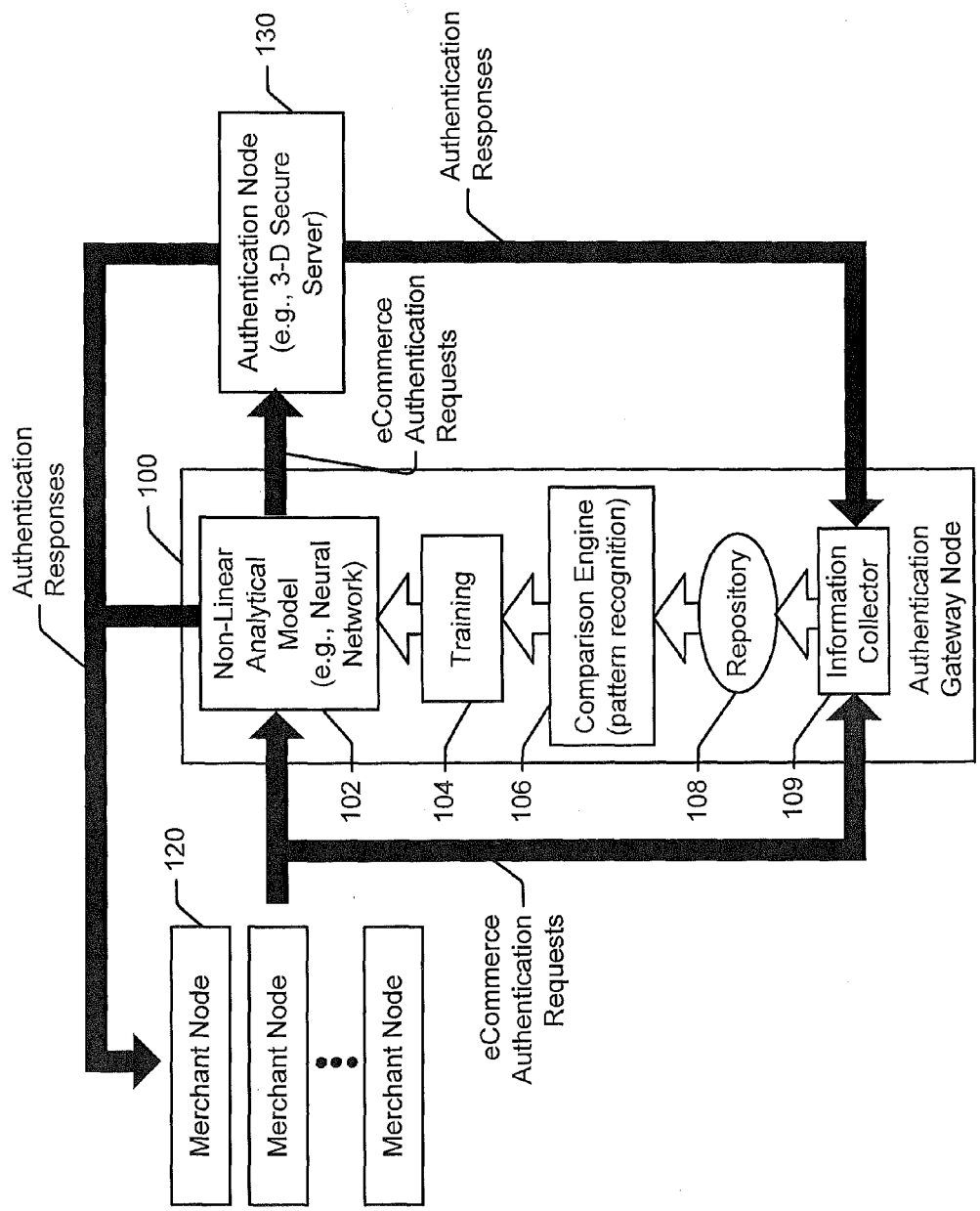
FIG. 2 is block diagram illustrating further details of an authentication portion of the financial transaction processing system of FIG. 1 configured in accordance with some embodiments.

FIG. 2 is a block diagram illustrating further details of an authentication portion of the financial transaction processing system of FIG. 1 configured according to some embodiments. Referring to FIG. 2, the authentication gateway node 100 receives eCommerce authentication requests from a plurality of merchant nodes 120. The authentication gateway node 100 processes content of each of the eCommerce authentication requests through a non-linear analytical model 102 (e.g., a neural network model) to generate risk scores for the eCommerce authentication requests.

The non-linear analytical model 102 has a non-linear relationship that allows different output values to be generated from a sequence of cycles of processing the same input values. Thus, repetitively processing the same input value(s) through the non-linear analytical model 102 can result in output of different corresponding values.

The authentication gateway node 100 include an information collector 109 that stores information, which identifies content of the eCommerce authentication requests received from the merchant nodes 120, in a repository 108. The content may be stored through a lossy combining process. For example, an item of the content may be mathematically combined and/or summarized with another item of the content and/or may be mathematically combined and/or summarized with one or more items already stored in the repository 108. The mathematically combining may include counting occurrences, averaging of amounts, etc. Summarization may include statistically representation or other characterization of the items of the content. As explained above, the repository 108 may additionally or alternatively reside at least partially within the merchant nodes 120 and/or another element of the financial transaction processing system.

A comparison engine 106 compares content of the eCommerce authentication requests in the repository to recognize patterns or other similarities that satisfy one or more defined rules. As explained above, the authentication gateway node 100 can generate a risk score for a received eCommerce authentication request based on comparison (e.g., by the comparison engine 106) of items of content of the received eCommerce authentication request to items of content of the eCommerce authentication requests in the repository, such as by recognizing patterns among the items of content or other similarities that satisfy one or more defined rules.

Figure 6:
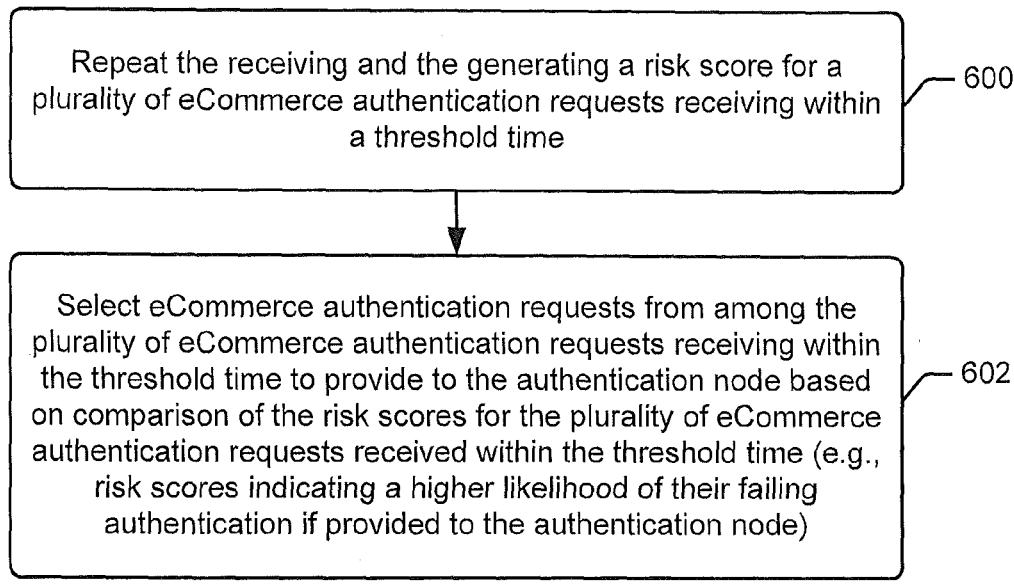

Referring to FIG. 2 and the flowchart of FIG. 6, the operations for receiving an eCommerce authentication request and generating a risk score can be repeated (block 600), e.g., performed sequentially or simultaneously, for a plurality of eCommerce authentication requests receiving within a threshold time (e.g., simultaneously occurring or nearly simultaneously) from the merchant nodes 120. The authentication gateway node 100 selects (block 602) eCommerce authentication requests from among the plurality of eCommerce authentication requests that are received within a threshold time to provide to the authentication node 130 based on comparison of the risk scores for the plurality of eCommerce authentication requests received within the threshold time. The authentication gateway node 100 may select a subset of the plurality of eCommerce authentication requests associated with risk scores indicating a higher likelihood of their failing authentication if provided to the authentication node 130, or which otherwise indicate a level of trustworthiness that the eCommerce authentication request originated from the account owner or another person authorized by the account owner. Other eCommerce authentication requests that are not within the subset can have authentication responses generated and communicated to the respective merchant nodes 120 without authentication processing by the authentication node 130 (e.g., the authentication gateway node 100 and/or the authentication node 130 can generate an authentication response based on a risk score of generated for a received eCommerce authentication request).

In another embodiment, when selectively providing the eCommerce authentication request to the authentication node 130, the authentication gateway node 100 may selectively mark the eCommerce authentication request to indicate whether authentication of a person, who is associated with the eCommerce authentication request, by the authentication node 130 is requested based on whether the risk score satisfies a defined rule. The authentication gateway node 130 then performs authentication processing (e.g., providing authentication challenges to purchasers) for only the eCommerce authentication requests that are marked for authentication. The authentication gateway node 130 can then generate the authentication responses based on a result of the authentication processing when performed, or based on the risk score when authentication processing is not performed.

In another embodiment, when selectively providing the eCommerce authentication request to the authentication node 130, the authentication gateway node 100 selectively routes the eCommerce authentication request to the authentication node 130 for authentication of a person, who is associated with the eCommerce authentication request, based on whether the risk score satisfies a defined rule. Accordingly, the authentication node 130 performs purchaser authentication processes for each eCommerce authentication request that it receives, however the authentication node 130 only receives eCommerce authentication requests having risk scores that the authentication gateway node 100 determined to satisfy a defined rule (e.g., having a risk score that exceeds a threshold level or alternatively that does not exceed a threshold level).

In another embodiment, the authentication node 130 can include some of the functionality described herein of the authentication gateway node 100. The authentication node 130 can receive all eCommerce authentication requests, but selectively generate an authentication challenge to the user equipment 110 (FIG. 1) to authenticate a person, who is associated with the transaction, only for eCommerce authentication requests having risk scores that satisfy a defined rule.

Output of the comparison engine 106 can additionally be used by a training circuit 104 (e.g., computer readable program code executed by a processor) to train the non-linear analytical model 102. The non-linear analytical model 102 may be a neural network model 102. The training circuitry 104 can train the neural network model 102 based on comparison (e.g., by the comparison engine 106) of items of content of the received eCommerce authentication request to items of content of the eCommerce authentication requests in the repository having the same or similar (e.g., according to a defined rule) at least a defined one of the items of the cardholder information as the received eCommerce authentication request. The comparison can include recognizing patterns among the items of content or other similarities that satisfy one or more defined rules.

The training circuitry 104 may additionally or alternatively train the neural network model 102 based on feedback from the merchant nodes 120, the authentication node 130, and/or other components of the financial processing system (e.g., the acquirer node 122 and/or the credit/debit finance issuer node 140). The training circuitry 104 may train the neural network model 102 based on feedback of results of authentication processes that have been performed and the associated characteristics of the eCommerce authentication requests associated with the authentication processes, which may include one or more of the characteristics explained above for FIG. 1 regarding training of the non-linear analytical model of the authentication gateway node 100.

For example, the neural network model 102 may be trained based on a comparison of content of a plurality of eCommerce authentication requests that were provided to the authentication node 130 and feedback of authentication responses from the authentication node 130 on the plurality of eCommerce authentication requests. Accordingly, the neural network model can learn over time to identify particular content or patterns of content occurring in a sequence of eCommerce authentication requests and/or occurring across a plurality of eCommerce authentication requests within a threshold time (e.g., simultaneously occurring or nearly simultaneously occurring) that are indicative of a greater or lesser likelihood that the purchasers associated with the eCommerce authentication requests will fail authentication if authentication processes are performed by the authentication node 130 on the eCommerce authentication requests.

By way of further example, the training circuitry 104 may train the neural network model 102 using content of eCommerce authentication requests that have been determined to have failed authentication processes by the authentication node 130, that resulted in a contested charge by account owners, nonpayment due to insufficient funds, fraudulent transaction against accounts which may be determined based on information provided by merchant nodes 120, the acquirer node 122, and/or the credit/debit finance issuer node 140.

The content of eCommerce authentication requests used to train the neural network model 102 may include one or more of account number (e.g., credit/debit card number), the expiration date for the card, the verification value (e.g., CVV), cardholder's name, cardholder's home address, purchaser's shipping address, identifier for the purchaser's user terminal, characteristics of the purchaser's user terminal, geographic region of the purchaser's user terminal, amount of the financial transaction, identifier for the merchant node 120, identifier for the acquirer node 122, identifier for the credit/debit finance issuer node 140, and a geographic region of: the account owner; purchaser's user terminal 110; merchant node 120; acquirer node 122; and/or the credit/debit finance issuer node 140. The training circuitry 104 may train the neural network model 102 based on one or more of the characteristics explained above for FIG. 1 regarding generation of a risk score by the authentication gateway node 100.

The non-linear analytical model may be alternatively or additionally be trained to identify when eCommerce authentication requests have one or more of the following characteristics:

1) generated by the acquirer node 122 at a rate that is outside an expected range (e.g., greater than a historical observed upper rate from the acquirer node 122 for a particular time of day and/or day or week/year);
2) associated with a same user terminal 110 and occurring at a rate that greater than an expected rate arising from a same user terminal (e.g., indication that eCommerce authentication requests are being electronically generated by a possibly malicious program instead of by a human purchaser);
3) associated with a same merchant node 120 and occurring at a rate that is outside an expected range (e.g., greater than a historical observed upper rate from the merchant node 120 and/or other merchant nodes having similar characteristics as the merchant node 120 for a particular time of day and/or day or week/year); and 4) arising from a same geographic region, such as geographic region of the user terminal 110, the merchant node 120, the acquirer node 122, and/or the credit/debit finance issuer node 140, and occurring at a rate that is outside an expected range (e.g., greater than a historical observed upper rate for a particular time of day and/or day or week/year).

The neural network model 102 may, for example, receive hundreds or thousands of simultaneously occurring or nearly simultaneously occurring eCommerce authentication requests from tens, hundreds, or thousands of different merchant nodes 120, and generate risk scores that are used to determine which of the eCommerce authentication requests will be processed by the authentication node 130 to authenticate associated purchasers (or other persons) associated with the eCommerce authentication requests.

Alternatively or additionally, the neural network model 102 may, for example, receive hundreds or thousands of sequentially occurring eCommerce authentication requests from a same one of the merchant nodes 120, and generate risk scores for each of the eCommerce authentication requests based on content of previous occurring ones of the eCommerce authentication requests in sequence. The resource score is used to determine which of the eCommerce authentication requests will be processed by the authentication node 130 to authenticate associated purchasers associated with the eCommerce authentication requests.

The neural network model 102 or other circuitry of the authentication gateway node 100 (e.g., comparison engine 106 or comparison process performed by a processor circuit) may compare the risk scores generated for a plurality of eCommerce authentication requests to, for example, select a defined number or percentage of the eCommerce authentication requests having risk scores that indicate a greater relative likelihood that the purchasers associated with the eCommerce authentication requests will fail authentication relative to the non-selected eCommerce authentication requests. Accordingly, instead of allowing all eCommerce authentication requests to be processed by the authentication node 130 for authentication, the authentication gateway node 100 can use the neural network model 102 to select a subset of the eCommerce authentication requests that are to be processed by the authentication node 130 for authentication.

Figure 3:
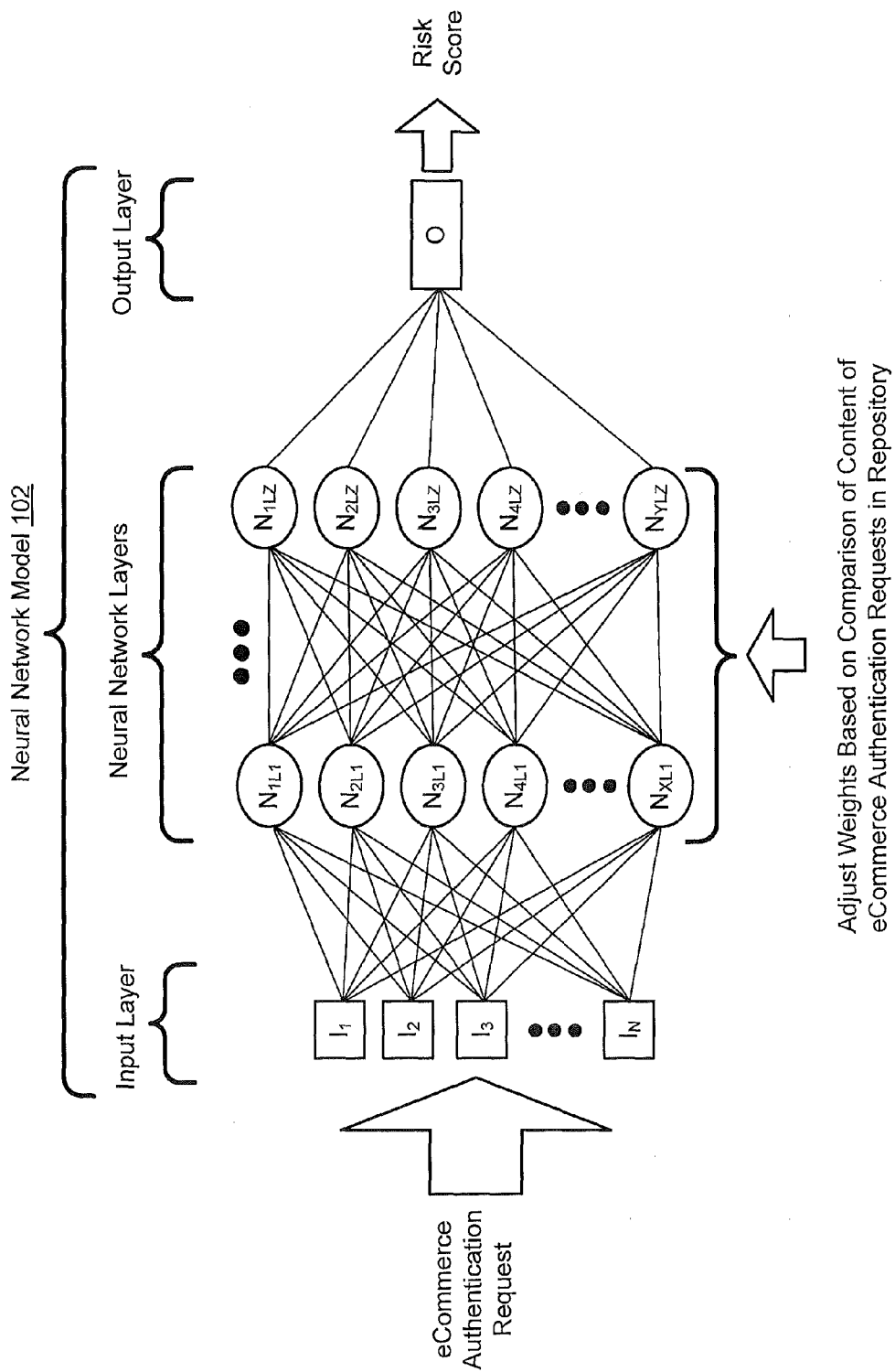
FIG. 3 is a block diagram of a neural network model that can be used in an authentication gateway node to generate a risk score for an eCommerce authentication request based on weight values that are adapted using feedback, in accordance with some embodiments.

FIG. 3 is a block diagram of a neural network model 102 that can be used in an authentication gateway node 100 to generate a risk score for an eCommerce authentication request. Referring to FIG. 3, the neural network model 102 includes an input layer having a plurality of input nodes, a sequence of neural network layers each including a plurality of weight nodes, and an output layer including an output node. In the particular non-limiting example of FIG. 3, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLZ}$ (where Y is any plural integer). The output layer includes an output node O.

The neural network model 102 of FIG. 3 is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of eCommerce authentication requests that are to be simultaneously processed, and the number of output nodes can be similarly selected based on the number of risk scores that are to be simultaneously generated therefrom.

The neural network model 102 can be operated to process a plurality of items of content of an eCommerce authentication request through different inputs (e.g., input nodes $I_1$ to $I_N$) to generate a risk score, and can simultaneously process items of content of a plurality of other eCommerce authentication requests (from the same or other ones of the merchant nodes 120 through different inputs nodes to generate a risk score for each of the other eCommerce authentication requests. The contents items associated with an eCommerce authentication request that can be simultaneously processed through different input nodes $I_1$ to $I_N$ may include any one or more of:

1) account number (e.g., credit/debit card number);
2) expiration date for the card;
3) verification value (e.g., CVV);
4) cardholder's name;
5) the cardholder's home address;
6) the purchaser's shipping address;
7) identifier for the purchaser's user terminal (e.g., network address of the user terminal, computer name, computer hardware identifier, and/or mobile identification number for mobile phone);
8) characteristics of the purchaser's user terminal (e.g., manufacturer, web browser characteristics, and/or operational characteristics);
9) geographic region of the purchaser's user terminal;
10) amount of the financial transaction;
11) identifier for the merchant node 120;
12) a geographic region of the merchant node 120;
13) identifier for the acquirer node 122;
14) time of transaction; and
15) date of transaction.

By way of example, the account number can be provided to input node $I_1$, the expiration date for the card can be provided to input node $I_2$, the CVV can be provided to input node $I_3$, the amount of the financial transaction can be provided to input node $I_4$, the identifier for the merchant node 120 can be provided to input node $I_5$, the purchaser's name can be provided to input node $I_6$, the user terminal identifier can be provided to input node $I_7$, the cardholder's home address can be provided to input node $I_8$, the purchaser's shipping address can be provided to input node $I_9$, a geographic region of the merchant node 120 can be provided to input node $I_{10}$, a geographic region of the acquirer node 122 can be provided to input node $I_{11}$, a geographic region of the credit/debit finance issuer node 140 can be provided to input node $I_{12}$, and characteristics of the purchaser's user terminal can be provided to input node $I_{13}$.

Items of content of other eCommerce authentication requests occurring simultaneously or within a threshold time can be similarly provided to further groups of input nodes (e.g., group $I_{14}$-$I_{26}$, group $I_{27}$-$I_{39}$, etc.). In this particular example, the content items associated with 100 different eCommerce authentication requests can be simultaneously or nearly simultaneously provided to an array of 1300 input nodes I (e.g., 100 eCommerce authentication requests, each having 13 content items). The weight nodes N of a plurality of neural network layers can process values output by the input nodes I to generate combined values that are provided to an array of output nodes O. The number of output nodes may be the same as the number of eCommerce authentication requests that are simultaneously processed by the neural network model 102, with each of the output nodes outputting a risk score for a different one of the eCommerce authentication requests. Thus, when the neural network model 102 is configured to simultaneously process 100 different eCommerce authentication request, 100 output nodes O can be provided to each output a risk score for a different one of the 100 eCommerce authentication requests.

The interconnected structure between the input nodes, the weight nodes of the neural network layers, and the output nodes causes the characteristics of each eCommerce authentication request to influence the risk score generated for all of the other eCommerce authentication requests that are simultaneously processed. The risk scores generated by the neural network model 102 may thereby identify a comparative prioritization of which of the eCommerce authentication requests have characteristics that provide a higher/lower likelihood of their failing/passing authentication if provided to the authentication node 130, or otherwise indicate a level of trustworthiness that the eCommerce authentication request originated from the account owner or another person authorized by the account owner. The authentication gateway node 100 can thereby select a group of the eCommerce authentication requests having an upper or lower range of the generated risk scores, and provide the selected group of eCommerce authentication request to the authentication node 130 for authentication processing. In sharp contrast, the other eCommerce authentication requests outside the selected group are not provided to the authentication node 130 for authentication processing, but instead have authentication responses generated based on their credit scores.

Figure 8:
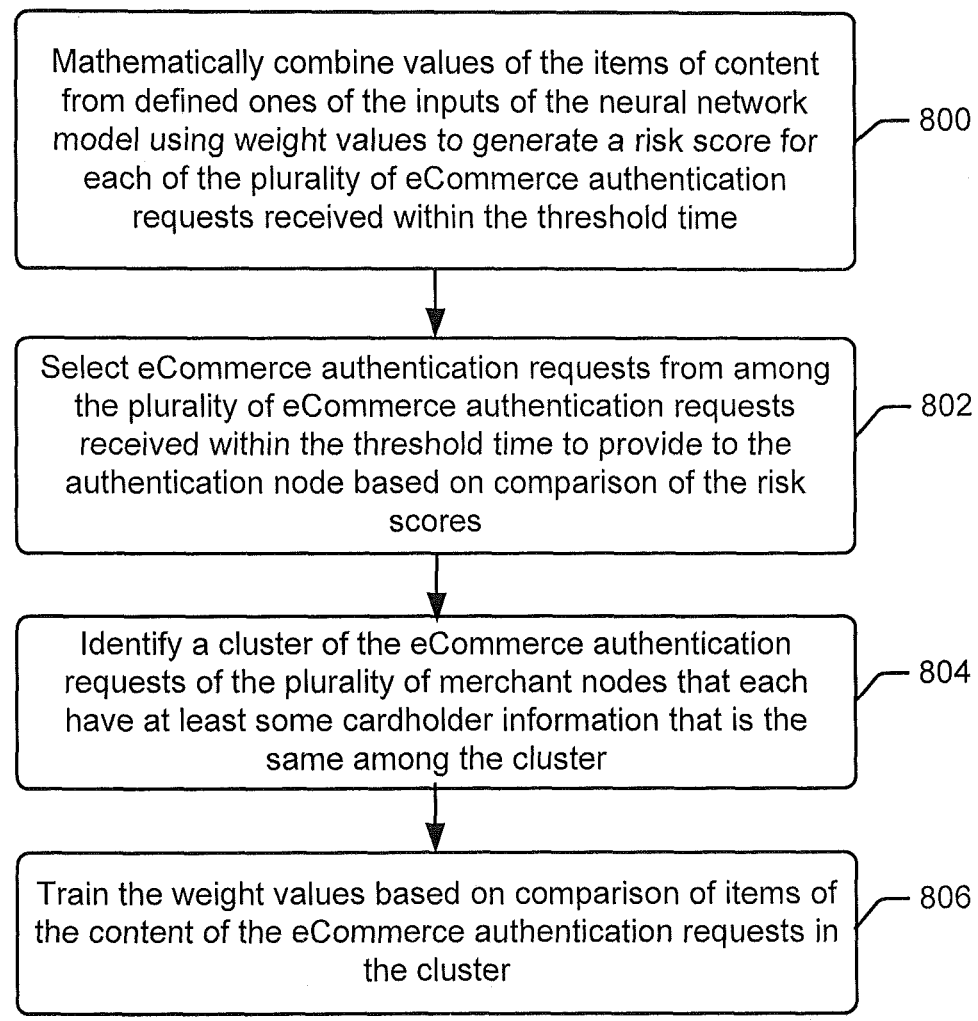

Referring to FIG. 3 and the flowchart of FIG. 8 of an embodiment, the neural network model 102 operates to mathematically combine (block 800) values of the items of content from defined ones of the inputs of the neural network using weight values to generate a risk score for each of the plurality of eCommerce authentication requests (e.g., sum values of the content items to generate a summed value that is multiplied by a weight value to generate the risk score). The neural network model 102 selects (block 802) eCommerce authentication requests from among the plurality of eCommerce authentication requests received within the threshold time to provide to the authentication node based on comparison of the risk scores.

More particular example operations that may be performed by the neural network model 102 of FIG. 3 can include operating the input nodes of the input layer to each receive a different one of the content items of an eCommerce authentication request and output a value. The neural network model 102 operates the weight nodes of the first one of the sequence of neural network layers using weight values to mathematically combine values that are output by the input nodes to generate combined values. Each of the weight nodes of the first layer may, for example, sum the values that are output by the input nodes, and multiply the summed result by a weight value that can be separately defined for each of the weight nodes (and may thereby be different between the weight nodes on a same layer) to generate one of the combined values.

The neural network model 102 operates the weight nodes of the last one of the sequence of neural network layers using weight values to mathematically combine the combined values from a plurality of weight nodes of a previous one of the sequence of neural network layers to generate combined values. Each of the weight nodes of the last layer may, for example, sum the combined values from a plurality of weight nodes of a previous one of the sequence of neural network layers, and multiply the summed result by a weight value that can be separately defined for each of the weight nodes (and may thereby be different between the weight nodes on a same layer) to generate one of the combined values.

The neural network model 102 operates the output node "O" of the output layer to combine the combined values from the weight nodes of the last one of the sequence of neural network layers to generate the risk score.

The comparison engine 106 may identify (block 804) a cluster of the eCommerce authentication requests (e.g., stored in the repository 108) of the plurality of merchant nodes that each have at least some cardholder information that is the same among the cluster. The cluster may be formed based on the eCommerce authentication requests having further matches between items of their cardholder information content, as defined by one or more rules. The training circuitry 104 can train (block 806) the weight values based on comparison of items of the content of the eCommerce authentication requests in the cluster.

Figure 9:
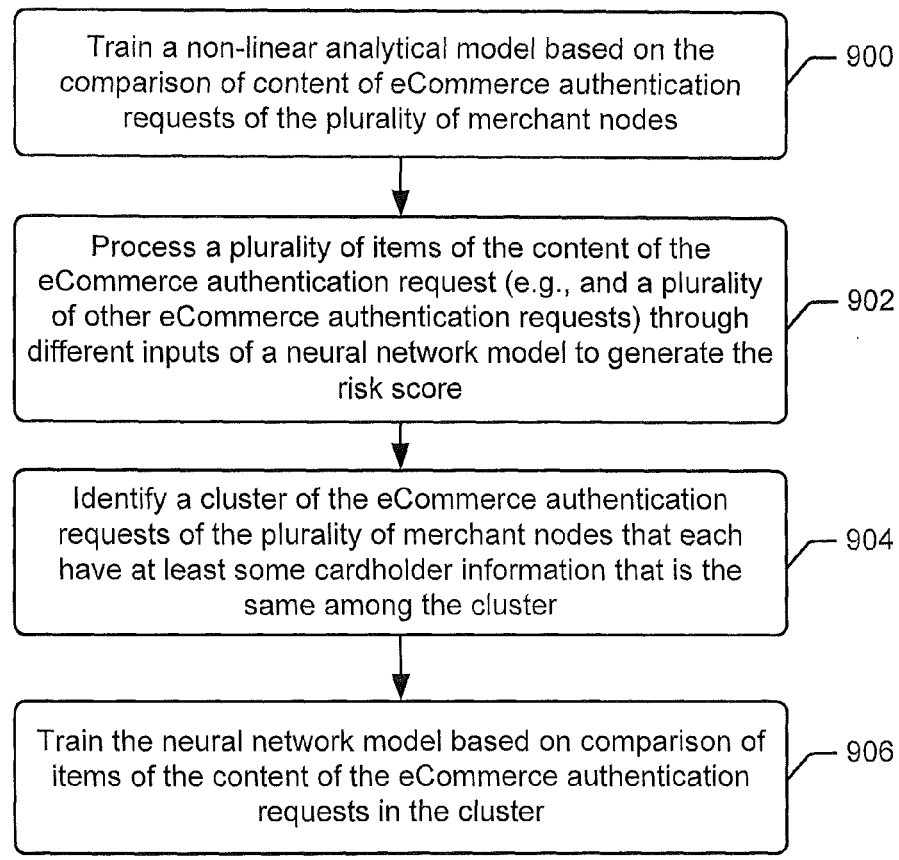

FIG. 9 illustrates further operations that may be performed by the training circuitry 104 and/or other components of the authentication gateway node 100 to train the non-linear analytical model 102, such as the example neural network model shown in FIG. 3. Referring to FIG. 9, the training circuitry 104 trains (block 900) the non-linear analytical model 102 based on the comparison of content of eCommerce authentication requests of the plurality of merchant nodes 120 which may reside in the repository 108. Content of the received eCommerce authentication request is processed (block 902) through the non-linear analytical model 102 to generate the risk score. The comparison engine 106 may identify (block 904) a cluster of the eCommerce authentication requests of the plurality of merchant nodes 120 that each have at least some cardholder information is the same among the cluster. The training circuit 104 can train (block 906) the neural network model based on comparison of items of the content of the eCommerce authentication requests in the cluster.

The non-linear analytical model 102 can be adapted (defined/adjusted) by the training circuit 104, such as by adapting (defining/adjusting) weight values of the neural network model of FIG. 3, based on comparison of content of eCommerce authentication requests in the cluster (such as using one or more of the operations described above by the authentication gateway node 100 to generate a risk score based on comparison of content), based on comparison of content of the received eCommerce authentication request to content of eCommerce authentication requests in the cluster, based on feedback information received from different ones of the merchant nodes 120 that defines characteristics of future eCommerce authentication requests needing authentication, based on feedback of results of authentication processes performed by the authentication node 130 on eCommerce authentication requests, and/or based on feedback information received from the acquirer node 122 and/or the credit/debit finance issuer node 140 that defines characteristics of future authentication requests that need authentication.

The non-linear analytical model 102 can be adapted, such as by adapting weight values of the neural network model of FIG. 3, based on feedback information received from a plurality of finance issuer nodes 140 that defines characteristics of future authentication requests that need authentication. Alternatively or additionally, the non-linear analytical model 102 can be adapted, such as by adapting weight values of the neural network model of FIG. 3, based on one or more of the characteristics explained above for FIG. 1 regarding generation of a risk score for a received eCommerce authentication request.

Although various embodiments have been disclosed herein for training the neural network model or, more generally, the non-linear analytical model 100 while it is processing eCommerce authentication requests from merchant nodes 120 which are operationally waiting for corresponding authentication responses, in some other embodiments the training is performed offline. For example, the training may be performed during production of the non-linear analytical model before its incorporation into an operational authentication gateway node 100 and/or the training may be performed while an authentication gateway node 100 is not actively processing eCommerce authentication requests from merchant nodes 120 awaiting authentication responses, such as while maintenance or other offline processes are performed on the authentication gateway node 100.

Figure 10:
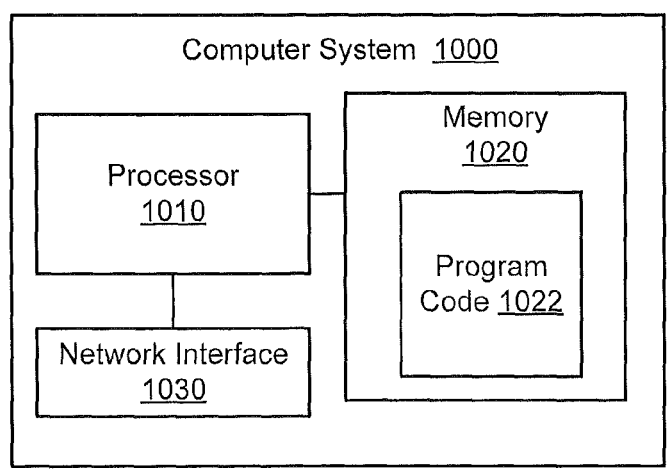
FIG. 10 is a block diagram of a computer system that may be incorporated into various components of the system of FIGS. 1-3, in accordance with some embodiments.

FIG. 10 is a block diagram of a computer system 1000 that may be used as an authentication gateway node 100, an authentication node 130, a merchant node 120, an acquirer node 122, a user terminal 110, and/or a credit/debit finance issuer node 140 to perform the operations of one of more of the embodiments disclosed herein for one or more of those elements. The computer system 1000 can include one or more network interface circuits 1030, one or more processor circuits 1010 (referred to as "processor" for brevity), and one or more memory circuits 1020 (referred to as "memory" for brevity) containing program code 1022.

The processor 1010 may include one or more data processing circuits, such as a general purpose and/or special purpose processor (e.g., microprocessor and/or digital signal processor) that may be collocated or distributed across one or more networks. The processor 1010 is configured to execute program code 1022 in the memory 1020, described below as a computer readable storage medium, to perform some or all of the operations for one or more of the embodiments disclosed herein.

A neural network of the authentication gateway node 100 may be implemented by the program code 1022 executed by the processor 1010 and/or may be implemented by other circuits that can include, but are not limited to, a digital gate array and/or analog circuits.

Further Definitions And Embodiments:

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of operating an authentication gateway computer server comprising:

performing by a processor of the authentication gateway computer server:

receiving, through a network interface of the authentication gateway computer server, a plurality of first eCommerce authentication requests from a plurality of first merchant nodes separate from the authentication gateway computer server, wherein respective ones of the plurality of first eCommerce authentication requests comprise first cardholder information;

receiving, through the network interface of the authentication gateway computer server, feedback information corresponding to at least one of the plurality of first eCommerce authentication requests;

training, using training circuitry of the authentication gateway computer server, a non-linear neural network model based on a comparison of the first cardholder information provided by the plurality of first eCommerce authentication requests and the feedback information corresponding to the at least one of the plurality of first eCommerce authentication requests to create a customized non-linear neural network model customized to the plurality of first eCommerce authentication requests received by the authentication gateway computer server, wherein the customized non-linear neural network model comprises an input layer comprising input nodes, a sequence of neural network layers each comprising a plurality of weight nodes, and an output layer comprising an output node;

receiving, through the network interface of the authentication gateway computer server, a second eCommerce authentication request from a second merchant node, the second eCommerce authentication request having content comprising second cardholder information;

generating a risk score for the second eCommerce authentication request based on comparison of the second cardholder information of the second eCommerce authentication request to first cardholder information of the first eCommerce authentication requests of the plurality of first merchant nodes by processing a plurality of items of the content of the second eCommerce authentication request through different inputs of the customized non-linear neural network model to generate the risk score for the second eCommerce authentication request, wherein processing the plurality of items of the content of the second eCommerce authentication request through different inputs of the customized non-linear neural network model comprises:

operating the input nodes of the input layer to each receive a different one of items of the content of the second eCommerce authentication request and output a value;

operating the weight nodes of a first one of the sequence of neural network layers using weight values to mathematically combine values that are output by the input nodes to generate combined values;

operating the weight nodes of a last one of the sequence of neural network layers using weight values to mathematically combine the combined values from a plurality of weight nodes of a previous one of the sequence of neural network layers to generate combined values; and operating the output node of the output layer to combine the combined values from the weight nodes of the last one of the sequence of neural network layers to generate the risk score; and selectively routing the second eCommerce authentication request through the network interface of the authentication gateway computer server to an authentication computer server, separate from the authentication gateway computer server, for additional authentication based on the risk score.

2. The method of claim 1, wherein the second cardholder information comprises an account number, an expiration date for a card, a verification value, a cardholder's name, a cardholder's home address, and a purchaser's shipping address.

3. The method of claim 1,
further comprising storing in a repository content of the first eCommerce authentication requests from the plurality of first merchant nodes;
wherein generating the risk score for the second eCommerce authentication request comprises comparing the second cardholder information of the second eCommerce authentication request to the first cardholder information of the first eCommerce authentication requests stored in the repository.

4. The method of claim 1, further comprising:
repeating the receiving and the generating a risk score for a plurality of third eCommerce authentication requests received within a threshold time; and
selecting eCommerce authentication requests from among the plurality of third eCommerce authentication requests received within the threshold time to selectively route to the authentication computer server based on comparison of the risk scores for the plurality of third eCommerce authentication requests received within the threshold time.

5. The method of claim 4, wherein selecting eCommerce authentication requests from among the plurality of third eCommerce authentication requests received within the threshold time to selectively route to the authentication computer server based on comparison of the risk scores for the plurality of third eCommerce authentication requests received within the threshold time, comprises:
selecting a subset of the plurality of the third eCommerce authentication requests associated with risk scores indicating a higher likelihood of their failing authentication if selectively routed to the authentication computer server.

6. The method of claim 1, wherein selectively routing the second eCommerce authentication request to the authentication computer server for additional authentication based on the risk score, comprises:
selectively marking the second eCommerce authentication request to indicate whether authentication of a person, who is associated with the second eCommerce authentication request, by the authentication computer server is requested based on whether the risk score satisfies a defined rule.

7. The method of claim 1, wherein selectively routing the second eCommerce authentication request to the authentication computer server for additional authentication based on the risk score, comprises:
selectively routing the second eCommerce authentication request to the authentication computer server for authentication of a person, who is associated with the second eCommerce authentication request, based on whether the risk score satisfies a defined rule.

8. The method of claim 1, wherein training the non-linear neural network model based on the comparison of the first cardholder information provided by the plurality of first eCommerce authentication requests comprises:
identifying a cluster of the first eCommerce authentication requests of the plurality of first merchant nodes that each have at least some cardholder information that is the same among the cluster; and
training the non-linear neural network model based on comparison of items of the content of the first eCommerce authentication requests in the cluster.

9. The method of claim 1, further comprising:
processing a plurality of items of content of a plurality of third eCommerce authentication requests, received within a threshold time, through different inputs of the customized non-linear neural network model to generate a risk score for each of the plurality of third eCommerce authentication requests received within the threshold time.

10. The method of claim 9, wherein processing the plurality of items of content of the plurality of third eCommerce authentication requests, received within the threshold time, through different inputs of the customized non-linear neural network model to generate the risk score for each of the plurality of third eCommerce authentication requests received within the threshold time, comprises:
mathematically combining values of the items of content from defined ones of the inputs of the customized non-linear neural network model using weight values to generate a risk score for each of the plurality of third eCommerce authentication requests received within the threshold time; and
selecting eCommerce authentication requests from among the plurality of third eCommerce authentication requests received within the threshold time to selectively route to the authentication computer server for additional authentication based on comparison of the risk scores.

11. The method of claim 10, further comprising:
adapting the weight values based on the comparison of content of the plurality of third eCommerce authentication requests to content of the first eCommerce authentication requests of the plurality of first merchant nodes.

12. The method of claim 11, wherein adapting the weight values based on the comparison of content of the plurality of third eCommerce authentication requests to content of the first eCommerce authentication requests of the plurality of first merchant nodes, comprises:
identifying a cluster of the first eCommerce authentication requests of the plurality of first merchant nodes that each have at least some cardholder information that is the same among the cluster; and training the weight values based on comparison of items of the content of the first eCommerce authentication requests in the cluster.

13. The method of claim 10, further comprising:

adapting the weight values based on feedback information received from different merchant nodes that defines characteristics of future eCommerce authentication requests needing authentication.

14. The method of claim 1, further comprising:

changing the weight values of the weight nodes of different ones of the neural network layers of the customized non-linear neural network model based on comparison of content of the first eCommerce authentication requests of the plurality of first merchant nodes.

15. The method of claim 1, wherein selectively routing the second eCommerce authentication request through the network interface of the authentication gateway computer server to the authentication computer server for additional authentication based on the risk score comprises:

generating a successful response for the second eCommerce authentication request to the second merchant node responsive to the generated risk score being less than a predetermined risk threshold without sending the second eCommerce authentication request to the authentication computer server,
wherein the successful response is generated to appear to originate from the authentication computer server, and transferring the second eCommerce authentication request to the authentication computer server responsive to the generated risk score being greater than a predetermined risk threshold.

16. An authentication gateway server comprising:

a network interface;

training circuitry;

a processor; and a memory coupled to the processor and comprising computer readable program code that when executed by the processor causes the processor to perform operations comprising:

receiving, through the network interface, a plurality of first eCommerce authentication requests from a plurality of first merchant nodes separate from the authentication gateway computer server, wherein respective ones of the plurality of first eCommerce authentication requests comprise first cardholder information;

receiving, through the network interface, feedback information corresponding to at least one of the plurality of first eCommerce authentication requests;

training, using the training circuitry, a non-linear neural network model based on a comparison of the first cardholder information provided by the plurality of first eCommerce authentication requests and the feedback information corresponding to the at least one of the plurality of first eCommerce authentication requests to create a customized non-linear neural network model customized to the plurality of first eCommerce authentication requests received by the authentication gateway computer server,
wherein the customized non-linear neural network model comprises an input layer comprising input nodes, a sequence of neural network layers each comprising a plurality of weight nodes, and an output layer comprising an output node;

receiving, through the network interface, a second eCommerce authentication request from a second merchant node, the second eCommerce authentication request having content comprising second cardholder information;

generating a risk score for the second eCommerce authentication request based on comparison of the second cardholder information of the second eCommerce authentication request to the first cardholder information of the first eCommerce authentication requests of Rafithe plurality of first merchant nodes by processing a plurality of items of the content of the second eCommerce authentication request through different inputs of the customized non-linear neural network model to generate the risk score for the second eCommerce authentication request, wherein processing the plurality of items of the content of the second eCommerce authentication request through different inputs of the customized non-linear neural network model comprises:

operating the input nodes of the input layer to each receive a different one of items of the content of the second eCommerce authentication request and output a value;

operating the weight nodes of a first one of the sequence of neural network layers using weight values to mathematically combine values that are output by the input nodes to generate combined values;

operating the weight nodes of a last one of the sequence of neural network layers using weight values to mathematically combine the combined values from a plurality of weight nodes of a previous one of the sequence of neural network layers to generate combined values; and operating the output node of the output layer to combine the combined values from the weight nodes of the last one of the sequence of neural network layers to generate the risk score; and selectively routing the second eCommerce authentication request through the network interface to an authentication computer server, separate from the authentication gateway computer server, for additional authentication based on the risk score.

17. The authentication gateway node of claim 16, wherein generating the risk score for the second eCommerce authentication request based on comparison of the second merchant information of the second eCommerce authentication request to first merchant information of the first eCommerce authentication requests, comprises:

storing in a repository content of the first eCommerce authentication requests from the plurality of first merchant nodes;

identifying a cluster of the first eCommerce authentication requests in the repository that each have at least some first cardholder information that is the same as contained in the second eCommerce authentication request; and generating the risk score for the second eCommerce authentication request based on similarity between a plurality of items of the content of the second eCommerce authentication request to a plurality of items of the content of the first eCommerce authentication requests in the cluster.

18. The authentication gateway node of claim 16, wherein selectively routing the second eCommerce authentication request through the network interface to the authentication computer server for additional authentication based on the risk score comprises:

generating a successful response for the second eCommerce authentication request to the second merchant node responsive to the generated risk score being less than a predetermined risk threshold without sending the second eCommerce authentication request to the authentication computer server,
wherein the successful response is generated to appear to originate from the authentication computer server, and
transferring the second eCommerce authentication request to the authentication computer server responsive to the generated risk score being greater than a predetermined risk threshold.

19. The authentication gateway node of claim 16, wherein the processor performs operations further comprising:

changing the weight values of the weight nodes of different ones of the neural network layers of the customized non-linear neural network model based on comparison of content of the first eCommerce authentication requests of the plurality of first merchant nodes.

20. A computer program product comprising:
a computer readable storage medium having computer readable program code embodied in the medium that when executed by a processor of an authentication gateway computer server causes the authentication gateway computer server to perform operations comprising:

receiving, through a network interface of the authentication gateway computer server, a plurality of first eCommerce authentication requests from a plurality of first merchant nodes separate from the authentication gateway computer server, wherein respective ones of the plurality of first eCommerce authentication requests comprise first cardholder information;
receiving, through the network interface of the authentication gateway computer server, feedback information corresponding to at least one of the plurality of first eCommerce authentication requests;
training, using training circuitry of the authentication gateway computer server, a non-linear neural network model based on a comparison of the first cardholder information provided by the plurality of first eCommerce authentication requests and the feedback information corresponding to the at least one of the plurality of first eCommerce authentication requests to create a customized non-linear neural network model customized to the plurality of first eCommerce authentication requests received by the authentication gateway computer server,
wherein the customized non-linear neural network model comprises an input layer comprising input nodes, a sequence of neural network layers each comprising a plurality of weight nodes, and an output layer comprising an output node;
receiving, through the network interface of the authentication gateway computer server, a second eCommerce authentication request from a second merchant node, the second eCommerce authentication request having content comprising second cardholder information;
generating a risk score for the second eCommerce authentication request based on comparison of the second cardholder information of the second eCommerce authentication request to first cardholder information of the first eCommerce authentication requests of the plurality of first merchant nodes by processing a plurality of items of the content of the second eCommerce authentication request through different inputs of the customized non-linear neural network model to generate the risk score for the second eCommerce authentication request,
wherein processing the plurality of items of the content of the second eCommerce authentication request through different inputs of the customized non-linear neural network model comprises:
operating the input nodes of the input layer to each receive a different one of items of the content of the second eCommerce authentication request and output a value;
operating the weight nodes of a first one of the sequence of neural network layers using weight values to mathematically combine values that are output by the input nodes to generate combined values;
operating the weight nodes of a last one of the sequence of neural network layers using weight values to mathematically combine the combined values from a plurality of weight nodes of a previous one of the sequence of neural network layers to generate combined values; and
operating the output node of the output layer to combine the combined values from the weight nodes of the last one of the sequence of neural network layers to generate the risk score; and
selectively routing the second eCommerce authentication request through the network interface of the authentication gateway computer server to an authentication computer server, separate from the authentication gateway computer server, for additional authentication based on the risk score.

21. The computer program product of claim 20, wherein selectively routing the second eCommerce authentication request through the network interface of the authentication gateway computer server to the authentication computer server for additional authentication based on the risk score comprises:

generating a successful response for the second eCommerce authentication request to the second merchant node responsive to the generated risk score being less than a predetermined risk threshold without sending the second eCommerce authentication request to the authentication computer server,
wherein the successful response is generated to appear to originate from the authentication computer server, and
transferring the second eCommerce authentication request to the authentication computer server responsive to the generated risk score being greater than a predetermined risk threshold.

22. The computer program product of claim 20 wherein the computer readable program code further causes the authentication gateway computer server to perform operations comprising:

changing the weight values of the weight nodes of different ones of the neural network layers of the customized non-linear neural network model based on comparison of content of the first eCommerce authentication requests of the plurality of first merchant nodes.

* * * * *